US008262773B2

(12) United States Patent
Northrop et al.

(10) Patent No.: US 8,262,773 B2
(45) Date of Patent: Sep. 11, 2012

(54) METHOD OF PURIFYING HYDROCARBONS AND REGENERATION OF ADSORBENTS USED THEREIN

(75) Inventors: P. Scott Northrop, Spring, TX (US); Francis S. Wu, The Woodlands, TX (US); Margaret Wu, legal representative, Calgary (CA); Narasimhan Sundaram, Fairfax, VA (US)

(73) Assignee: ExxonMobil Upstream Research Company, Houston, TX (US)

( * ) Notice: Subject to any disclaimer, the term of this patent is extended or adjusted under 35 U.S.C. 154(b) by 550 days.

(21) Appl. No.: 11/920,824

(22) PCT Filed: May 23, 2006

(86) PCT No.: PCT/US2006/019891
§ 371 (c)(1),
(2), (4) Date: Apr. 21, 2010

(87) PCT Pub. No.: WO2007/018677
PCT Pub. Date: Feb. 15, 2007

(65) Prior Publication Data
US 2011/0277496 A1 Nov. 17, 2011

Related U.S. Application Data

(60) Provisional application No. 60/702,402, filed on Jul. 26, 2005.

(51) Int. Cl.
*B01D 53/04* (2006.01)
*C10L 3/06* (2006.01)
(52) U.S. Cl. ............... 95/114; 95/141; 95/148; 585/820
(58) Field of Classification Search ............ 95/90, 114, 95/115, 117, 122, 141, 143, 148; 96/121, 96/131, 132, 143; 585/820
See application file for complete search history.

(56) References Cited

U.S. PATENT DOCUMENTS
2,755,231 A 7/1956 Blanding et al.
(Continued)

FOREIGN PATENT DOCUMENTS
EP 0 332 324 A2 9/1989
(Continued)

OTHER PUBLICATIONS

Carlsson, A. F. et al., "How to Avoid Excessive Mol Sieve Deactivation When Used for Mercaptan Removal", 84$^{th}$ Annual Gas Processors Association, Mar. 13-16, 2005, pp. 1-14, San Antonio, TX.

(Continued)

*Primary Examiner* — Frank Lawrence, Jr.
(74) *Attorney, Agent, or Firm* — ExxonMobil Upstream Research Company Law Department

(57) ABSTRACT

An improved method is provided for removing contaminants from a hydrocarbon stream, such as a stream of raw natural gas. The contaminated hydrocarbon stream is passed through a first adsorbent bed containing molecular sieves to adsorb contaminants on the molecular sieves, thereby removing at least some of the contaminants from the hydrocarbon stream. The contaminated hydrocarbon stream may optionally be passed through a second adsorbent bed containing a desiccant material other than molecular sieves. The molecular sieves are regenerated using a wet regeneration process in which both the water content and temperature of the regeneration fluid stream are staged. The molecular sieves and the desiccant material can also be regenerated by contacting the desiccant material with a regeneration fluid stream comprising water to adsorb at least a portion of the water onto the desiccant material, thereby forming a regeneration fluid stream that is at least partially dried and in contact with a desiccant material that is at least partially hydrated. The hydrated desiccant material is heated to release adsorbed water into the partially dried regeneration fluid stream while such regeneration fluid stream is passed through the molecular sieves to desorb and remove at least a portion of the contaminants adsorbed on the molecular sieves. A method for producing liquefied natural gas employing such improved method is also disclosed.

46 Claims, 2 Drawing Sheets

U.S. PATENT DOCUMENTS

| | | | |
|---|---|---|---|
| 2,758,099 A | 8/1956 | Etherington | |
| 3,051,646 A | 8/1962 | Brooke | |
| 3,082,166 A | 3/1963 | Skarstrom | |
| 3,188,293 A | 6/1965 | Bacon et al. | |
| 3,197,415 A | 7/1965 | Hendrix | |
| 3,407,148 A | 10/1968 | Eastwood et al. | |
| 3,492,083 A | 1/1970 | Lowicki et al. | |
| 3,566,611 A | 3/1971 | Sterrett | |
| 3,620,969 A | 11/1971 | Turnock et al. | |
| 3,683,592 A | 8/1972 | Kamm et al. | |
| 3,725,299 A | 4/1973 | Turnock et al. | |
| 3,816,975 A | 6/1974 | Collins | |
| 3,841,058 A | 10/1974 | Templeman | |
| 3,892,677 A | 7/1975 | Naber et al. | |
| 4,043,938 A | 8/1977 | Reif et al. | |
| 4,233,038 A | 11/1980 | Tao | |
| 4,248,706 A | 2/1981 | Repik | |
| 4,263,020 A | 4/1981 | Eberly, Jr. | |
| 4,276,149 A | 6/1981 | Chester et al. | |
| 4,319,057 A | 3/1982 | Kiser | |
| 4,358,297 A | 11/1982 | Eberly, Jr. | |
| 4,547,284 A | 10/1985 | Sze et al. | |
| 4,572,903 A | 2/1986 | Hino et al. | |
| 4,574,044 A | 3/1986 | Krug | |
| 4,575,567 A | 3/1986 | Vora | |
| 4,594,146 A | 6/1986 | Chester et al. | |
| 4,647,549 A | 3/1987 | Greenwood | |
| 4,649,127 A | 3/1987 | Degnan, Jr. et al. | |
| 4,795,545 A | 1/1989 | Schmidt | |
| 5,041,693 A | 8/1991 | Zarchy | |
| 5,089,034 A * | 2/1992 | Markovs et al. | 95/99 |
| 5,093,293 A | 3/1992 | Laukonen | |
| 5,376,607 A | 12/1994 | Sechrist | |
| 5,527,750 A | 6/1996 | Haun et al. | |
| 5,538,706 A | 7/1996 | Kapoor et al. | |
| 5,688,479 A | 11/1997 | Chao | |
| 6,060,033 A | 5/2000 | Cheng | |
| 6,245,703 B1 | 6/2001 | Kuechler et al. | |
| 6,290,916 B1 | 9/2001 | Sechrist et al. | |
| 6,395,664 B1 | 5/2002 | Boehner et al. | |
| 6,455,748 B2 | 9/2002 | Janssen et al. | |
| 6,461,992 B1 | 10/2002 | Sechrist et al. | |
| 6,498,120 B1 | 12/2002 | Janssen et al. | |
| 6,579,507 B2 * | 6/2003 | Pahlman et al. | 423/210 |
| 6,580,010 B2 | 6/2003 | Searle | |
| 6,585,883 B1 | 7/2003 | Kelemen et al. | |
| 6,713,422 B1 | 3/2004 | Menger et al. | |
| 6,713,423 B2 | 3/2004 | Mazyck | |
| 6,787,024 B2 | 9/2004 | Siskin et al. | |
| 6,797,854 B1 | 9/2004 | Jochem | |
| 6,821,411 B2 | 11/2004 | Baca et al. | |
| 6,825,391 B2 | 11/2004 | Janssen et al. | |
| 6,843,907 B1 | 1/2005 | Kanazirev et al. | |
| 6,984,765 B2 * | 1/2006 | Reyes et al. | 585/639 |
| 2001/0049328 A1 | 12/2001 | Zhao et al. | |
| 2005/0009692 A1 | 1/2005 | Wang | |
| 2006/0107832 A1 | 5/2006 | Van De Graaf et al. | |

FOREIGN PATENT DOCUMENTS

| | | |
|---|---|---|
| EP | 0 335 034 A1 | 10/1989 |
| GB | 1 354 760 | 5/1974 |
| GB | 2 275 625 A | 9/1994 |
| WO | WO 00/56441 | 9/2000 |
| WO | WO 03/061820 A2 | 7/2003 |
| WO | WO 2004/039926 A1 | 5/2004 |

OTHER PUBLICATIONS

Miester, P., "UOP Presentation for the GPA Europe National Conference: Natural Gas Front End Treating & Sulfur Management Options", Gas Processors Association Europe Annual Conference, Sep. 29-Oct. 1, 2004, pp. 1-24, St. Cyr Sur Mer, France.

Rep, M. et al., "I.r. study on the reaction path of methanol decomposition over basic zeolites", *Zeolites and Mesoporous Materials at the Dawn of the 21st Century: Proceedings of the 13th International Zeolite Conference*, Jul. 8-13, 2001, pp. 4764-4771, Montpellier France.

European Search Report No. 113058, dated May 3, 2006, 4 pages.

International Search Report and Written Opinion for International Application No. PCT/US06/19891, mailed Oct. 26, 2007, 8 pages.

\* cited by examiner

METHOD OF PURIFYING HYDROCARBONS AND REGENERATION OF ADSORBENTS USED THEREIN

CROSS REFERENCE TO RELATED APPLICATIONS

This application is the National Stage of International Application No. PCT/US06/19891, which claims the benefit of U.S. Provisional Application No. 60/702,402, filed 26 Jul. 2005.

TECHNICAL FIELD

Embodiments of the invention relate generally to the purification of hydrocarbon streams, in particular to the purification of raw natural gas streams for use in the production of liquefied natural gas (LNG). Specifically, embodiments of the invention relate to the use of adsorbents to purify hydrocarbon streams and to an improved method for regenerating such adsorbents.

BACKGROUND

Raw natural gas and other hydrocarbon streams often contain naturally occurring contaminants, such as, for example, water vapor, $CO_2$, $H_2S$, and mercaptans, and other sulfur compounds. In the case of raw natural gas, other contaminants, such as methanol or glycol, are sometimes purposely added at the natural gas field production facility to prevent the formation of hydrates or ice in the natural gas production stream while it is in transit to the treating facility. Whether such contaminants occur naturally in the gas or are purposely added, they must be substantially removed prior to use of the natural gas in certain industrial or residential applications.

One method of removing contaminants from hydrocarbon streams, including raw natural gas streams, involves the use of solid adsorbents which include, for example, alumina, silica gel, activated carbon and molecular sieves such as zeolites. These materials are typically used in packed beds. Typically, a contaminated hydrocarbon stream, either in gaseous or liquid form, is passed through the bed and the adsorbent materials in the beds preferentially adsorb the contaminants, thereby reducing their concentration in the hydrocarbon stream effluent emerging from the bed.

The adsorbents eventually become saturated with adsorbed contaminants, at which point the adsorbent will no longer effectively remove the contaminants from the hydrocarbon stream. When saturation occurs, the adsorbent materials must be either replaced or regenerated. One way of regenerating an adsorbent is to pass a heated regeneration fluid stream, either in a gaseous or a liquid state, through the adsorbent bed, often in a countercurrent manner. In this way, the adsorbed contaminants are desorbed from the adsorbent and moved into the regeneration fluid stream in which they are carried out of the bed. The regeneration fluid stream can then be purified and recycled, or it can be used as fuel gas.

During regeneration, temperatures in the beds can often reach approximately 600° F. At these temperatures, particularly in the case of zeolitic molecular sieves, some adsorbed species may "crack" to form highly carbonaceous compounds, or "coke." For example, while water and some other compounds are simply desorbed from the molecular sieves during regeneration, alcohols, glycols, heavy hydrocarbons such as benzene, toluene, and xylenes (BTEX), mercaptans, and organic sulfides and disulfides may be subject to cracking on molecular sieves during regeneration. In the case of alcohols, one possible decomposition mechanism results in the formation of the corresponding olefins (R') and water according to equation (1):

$$ROH + heat \rightarrow R' + H_2O \qquad (1)$$

Under the acidic conditions of a typical mole sieve, the olefins may form polymers, and these polymers may then dehydrogenate to form coke. A similar decomposition mechanism may apply to the decomposition of mercaptans. The coke formed from such decomposition reactions plugs the pores of the molecular sieves and builds up over repeated thermal regeneration cycles, thereby hindering fluid flow through the molecular sieve bed, eventually rendering it ineffective. When this occurs, the molecular sieves can no longer be regenerated and must be replaced at potentially significant expense, including possibly expenses incurred from unplanned downtime for the hydrocarbon purification facility. Adsorbed species that may cause coking on molecular sieves include, but are not limited to, mercaptans, organic sulfides, disulfides, heavy hydrocarbons, methanol, and glycol.

In addition to deactivation by coking, molecular sieves can also undergo thermal deactivation. For this reason, it would be desirable to use a low regeneration temperature. If the regeneration temperature is too low, however, the quality of the product obtained from the regenerated molecular sieves may be inadequate. That is, if the regeneration temperature is too low to sufficiently desorb contaminants on the molecular sieves, the absorptive capacity of the regenerated molecular sieves will be low and the natural gas product or other fluid product obtained by treatment with such molecular sieves will have a contaminant level that is unacceptably high.

Thermal decomposition and decomposition of methanol, mercaptans, and other adsorbed species during thermal regeneration of molecular sieve adsorbents (coking) are well-recognized problems in the industry. Accordingly, embodiments of the present invention provide an improved method of removing contaminants from hydrocarbon streams using molecular sieves and an improved method of regenerating the molecular sieves while reducing the decomposition of adsorbed contaminants. Some embodiments of the improved methods described herein permit the use of lower overall regeneration temperatures to help reduce coking and thermal deactivation while at the same time maintaining product quality. Other embodiments incorporate such improved methods in a method for producing liquefied natural gas (LNG).

SUMMARY

In one or more embodiments, a method is provided for removing contaminants from a hydrocarbon stream, such as a stream of raw natural gas. The contaminated hydrocarbon stream is passed through a first adsorbent bed containing molecular sieves to adsorb contaminants on the molecular sieves, thereby removing at least some of the contaminants from the hydrocarbon stream. The contaminated hydrocarbon stream may optionally also be passed through a second adsorbent bed containing a simple desiccant material, that is, a material other than molecular sieves that can reversibly adsorb water. In this specification and in the appended claims, the terms "adsorbent bed," "adsorption bed," and "adsorbent zone" are used interchangeably. An adsorbent bed, adsorption bed, or adsorbent zone may also be referred to simply as a "zone" or "bed" or as a "molecular sieve zone" or "desiccant material zone." In some embodiments the desiccant material is selected from the group consisting of metal oxides, silica gel, and activated carbon. In embodiments where both molecular sieves and a desiccant material are used, the molecular sieves and the desiccant material are regenerated by contacting the desiccant material with a regeneration fluid stream comprising water to adsorb at least a portion of the water onto the desiccant material, thereby forming a regeneration fluid stream that is at least partially dried and in contact with a hydrated desiccant material that is at least partially hydrated. The regeneration fluid stream comprising water contacts the desiccant material before it reaches the molecular sieve adsorbent bed, and the water is at least partially adsorbed onto the desiccant material. The at least partially hydrated desiccant material is heated to release adsorbed water into the partially dried regeneration fluid stream while such regeneration fluid stream is passed through the molecular sieves to desorb and remove at least a portion of the contaminants adsorbed on the molecular sieves.

In some embodiments of the present method utilizing only a bed of molecular sieves, the molecular sieves are regenerated by using a staged process in which both the water content and temperature of regeneration fluid stream are staged. Specifically, the regeneration is carried out by passing a first regeneration fluid stream comprising water through the molecular sieves adsorbent bed for a first period of time while maintaining the temperature of the first regeneration fluid stream in a range of from about 50° C. to about 200° C. The first regeneration stream comprises 10 ppmv or more of water. The regeneration is then continued by passing a second regeneration fluid stream through the molecular sieves adsorbent bed for a second period of time, wherein the second regeneration fluid stream comprises water in an amount less than 20 ppmv, or less than 10 ppmv, or less than 1 ppmv, or less than 0.1 ppmv, with the further proviso that the water content of the first regeneration fluid stream is greater than that of the second regeneration fluid stream. During the second period of time the temperature of said second regeneration fluid stream in maintained in a range of from about 250° C. to about 400° C.

In another embodiment, a method of regenerating molecular sieves is provided in which the molecular sieves are placed in fluid communication with a bed containing a desiccant material. The desiccant material is contacted with a regeneration fluid stream comprising water to adsorb at least a portion of the water onto the desiccant material to form a regeneration fluid stream that is at least partially dried and in contact with a desiccant material that is at least partially hydrated. The at least partially hydrated desiccant material is heated to a temperature above about 70° C., preferably above 100° C.-130° C., to release water adsorbed thereon into the at least partially dried regeneration fluid stream as said stream is passed through the molecular sieves to desorb and remove at least a portion of said contaminants adsorbed on the molecular sieves.

In still another embodiment, a method of producing a liquefied natural gas (LNG) is provided. As used in this specification and in the appended claims, the term "natural gas" means a light hydrocarbon gas or a mixture of two or more light hydrocarbon gases. Illustrative light hydrocarbon gases may include, but are not limited to, methane, ethane, propane, butane, pentane, hexane, isomers thereof, unsaturates thereof, and mixtures thereof. Natural gas as it is produced from a reservoir prior to any purification (i.e., raw natural gas) may include some level of one or more contaminants, such as nitrogen, hydrogen sulfide, carbon dioxide, carbonyl sulfide, mercaptans and water. In some embodiments herein, the natural gas is also contaminated with an intentionally added contaminant, such as, for example, methanol (which may be added to serve as a hydrate inhibitor). The exact percentage composition of the natural gas varies depending upon the reservoir source and any pre-processing steps, such as amine extraction. At least one example of "natural gas" is a composition comprising about 55 mole % of methane or more. In some embodiments, the method of producing LNG provided herein comprises providing a contaminated natural gas stream, optionally passing the contaminated natural gas stream through a first adsorbent bed containing a desiccant material; passing the contaminated natural gas stream, or, optionally, passing the effluent from said first adsorbent bed, through a second adsorbent bed containing molecular sieves regenerated according to any embodiment of the method of regeneration described herein, thereby producing a natural gas stream having a reduced contaminant content; optionally, passing the natural gas stream having a reduced contaminant content through a third adsorbent bed comprising a desiccant material; recovering the effluent from the second or, alternatively, from the third adsorbent bed; and cooling said effluent to a temperature sufficient to produce a liquefied natural gas at atmospheric pressure.

In another embodiment, a method for removing methanol from a hydrocarbon stream is provided. A methanol-contaminated hydrocarbon stream, such as, for example, raw natural gas, is passed through a first adsorbent bed comprising molecular sieves to adsorb methanol on the molecular sieves. Thereafter the methanol-laden molecular sieves are regenerated by passing a regeneration fluid stream comprising up to 10,000 ppmv of water vapor at a temperature of 50° C. to 400° C. to desorb and remove methanol adsorbed on said molecular sieves.

DETAILED DESCRIPTION

Figure 1:
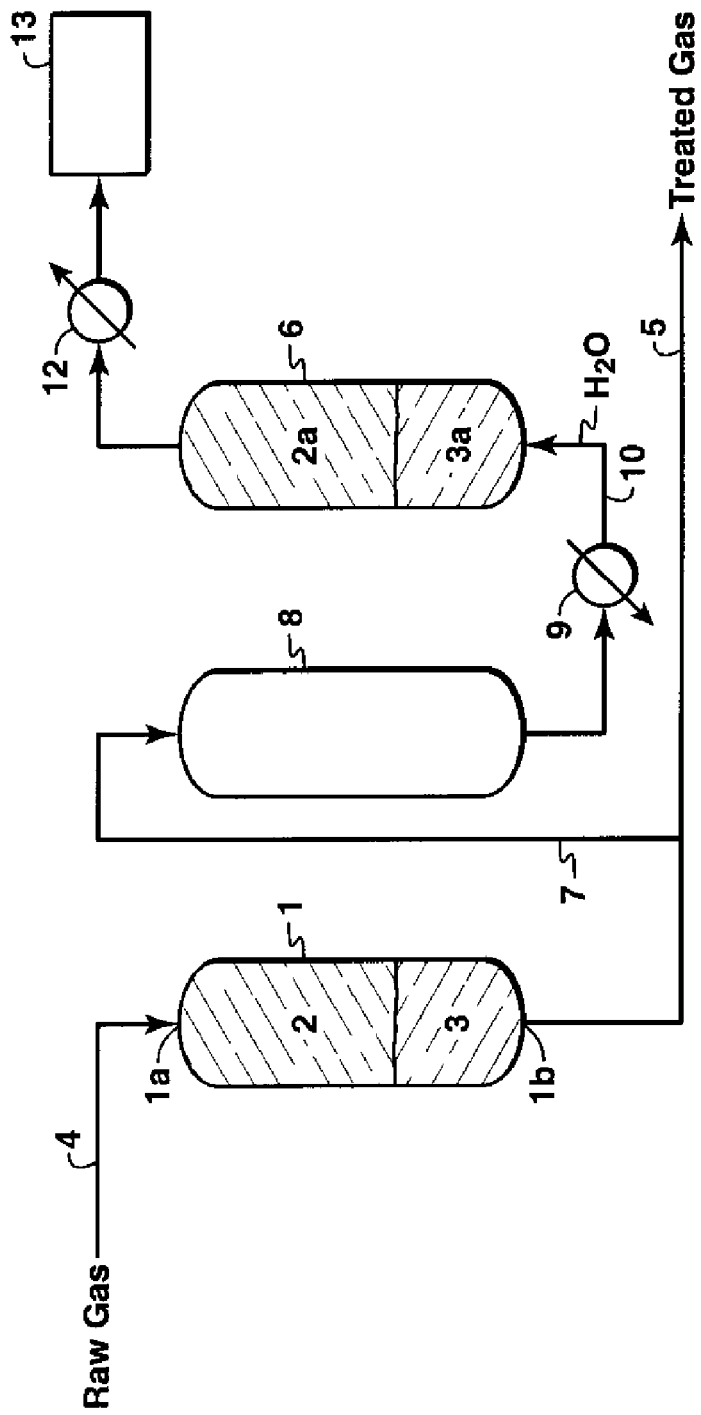
FIG. 1 shows a typical 3-adsorber equipment and arrangement that can be used in embodiments of the invention.

Embodiments of the present invention can be carried out in, for example, typical adsorption bed purification equipment of the type and arrangement shown in FIG. 1, although any type and arrangement of equipment used in the industry would be suitable.

Referring to FIG. 1, in one or more embodiments a bed of molecular sieves is positioned within treatment vessel 1 to create a first adsorbent bed 2 containing molecular sieves. A second bed 3 consisting of a desiccant material is positioned within the same vessel either downstream or upstream of the molecular sieve bed with respect to the flow direction of the contaminated hydrocarbon stream. In FIG. 1, second bed 3 is shown downstream of the molecular sieve bed. In other embodiments, discussed below, beds 2 and 3 in treatment vessel 1, and beds 2a and 3a in regeneration vessel 6, can be replaced with single beds of molecular sieves. As used herein, the term "desiccant material" is use to denote any material, other than molecular sieves, that is capable of reversibly adsorbing water. The flow direction of the contaminated hydrocarbon stream may, of course, be in either a downward or an upward direction, and it is shown in a downward direction in FIG. 1 for purposes of illustration only. In the case where the desiccant material bed 3 is positioned downstream of the molecular sieve bed and the flow of the contaminated hydrocarbon stream is in a downward direction through the treatment vessel, the desiccant material bed will be located beneath the molecular sieve bed 2. In this embodiment, a contaminated hydrocarbon stream 4 is introduced into the top of treatment vessel 1 and is passed through first adsorbent bed 2 where at least some of the contaminants in hydrocarbon stream 4 are adsorbed onto the molecular sieves in first adsorbent bed 2. The contaminated hydrocarbon stream is then passed through second adsorbent bed 3, which contains a desiccant material, where additional contaminants may be removed, thereby producing treated hydrocarbon stream 5. Although not shown in FIG. 1, treatment vessel 1 may be equipped with a bottom distributor plate for supporting the beds. Treatment vessel 1 is equipped with raw fluid (i.e., contaminated hydrocarbon) inlet and treated fluid (gas or liquid) outlet openings, shown at 1$a$ and 1$b$, respectively.

Once the molecular sieve and/or desiccant material are saturated with adsorbed contaminants, they are regenerated. Referring again to FIG. 1, a regeneration vessel containing molecular sieve and desiccant material beds to be regenerated according to one or more embodiments of the invention is shown at 6. It will be understood that treatment vessel 1 becomes a regeneration vessel when its adsorbents are saturated and in need of regeneration, and that regeneration vessel 6 becomes a treatment vessel when the regeneration is complete and the bed has been cooled. Each vessel is thus repeatedly alternated between treatment ("Treat"), regeneration ("Regen"), and cool down ("Cool") cycles. Thus, in some embodiments, the present method comprises: (a) passing a contaminated hydrocarbon stream through one or more desiccant material adsorption beds and a molecular sieve adsorption bed disposed in one or more treatment vessels to adsorb at least a portion of the contaminants onto at least the molecular sieves; (b) regenerating said molecular sieve adsorption bed by: (i) depressurizing the one or more treatment vessels and (ii) performing a "hot purge" in which said one or more desiccant material adsorption beds and said molecular sieve adsorption bed are purged with a warm and/or hot regeneration fluid stream comprising water to desorb and remove at least a portion of the contaminants adsorbed on at least the molecular sieves, said regeneration fluid stream comprising water contacting a desiccant material adsorption bed prior to contacting said molecular sieve adsorption bed; (c) performing a cold purge of said one or more desiccant material adsorption beds and said molecular sieve adsorption bed to remove additional contaminants and cool said beds; and (d) repressurizing the treatment vessel to the desired service pressure. The hot purge is typically carried out at a temperature range of from about 50° C. to about 400° C. with a duration of from about 10 minutes to about 48 hours. The cold purge, which may be carried out using a regeneration fluid stream at a temperature of, for example, about 20° C. to about 45° C., typically has a duration of from about 10 minutes to about 48 hours. In one or more embodiments, the method described herein produces purified natural gas having a water content of less than 5 ppmv, alternatively from about 0.1 to about 0.5 ppmv, and a methanol content of less than 1 ppmv, alternatively from about 0.1 to about 0.5 ppmv. The pressures utilized in both the treatment steps and in the regeneration steps are not critical, and may be selected using criteria well known to those of ordinary skill in the art. For example, the regeneration may be carried out using standard pressures, such as pressures between 1 and 150 bara.

In one or more embodiments of the regeneration method provided herein, the adsorbent beds are arranged as described above, with the bed of molecular sieves positioned above the bed consisting of a desiccant material. In such embodiments, the regeneration fluid stream is passed counter-currently (relative to the flow of the contaminated hydrocarbon stream) through the adsorbent beds to be regenerated. There are several additional advantages to this embodiment. As is well known in the industry, as an adsorption column approaches the point at which it will need regeneration, it will exhibit a concentration gradient of adsorbed contaminants along the length of, or a portion of the length of, the adsorbent bed. That is, the loading of the adsorbed contaminants will be highest near the "raw gas" or "raw liquid" (i.e., contaminated hydrocarbon) feed end of the treatment vessel and lower, ideally zero, at the "product end" (or treated gas or liquid outlet) of the treatment vessel. Thus, when water is a contaminant in the contaminated hydrocarbon stream, just prior to regeneration the water concentration will be higher near the feed end of the treatment vessel and very low or zero in the product end of the treatment vessel. Since it is highly desirable to keep the product end free of contaminants, it is often desirable to protect the product end by performing the regeneration step in a counter-current manner so that the adsorbed contaminants are desorbed and moved away from the product end (i.e., toward the feed end of the treatment vessel). If a regeneration fluid stream comprising water is used in a counter-current regeneration of molecular sieves, any water that condenses or collects in the product end will likely contaminate and deactivate the relatively clean molecular sieves in product end, thereby defeating the purpose of using a counter-current regeneration. By interposing a desiccant material bed between the incoming regeneration fluid comprising water and the molecular sieves in the product end, the risk of water condensation and hydrothermal deactivation of the molecular sieves is reduced. Thus, in some embodiments the inventive method is carried out according to any of the other embodiments described herein, with the additional feature that a regeneration fluid stream comprising water is introduced into the product end of the treatment vessel.

Referring again to FIG. 1, a slipstream 7 of treated gas 5 can be used as the regeneration fluid stream. However, any suitable fluid or combination of fluids may be used in forming the regeneration fluid stream. For example, the contaminated hydrocarbon stream itself or another gas, such as methane, can be used as the regeneration fluid stream. Such streams, either alone or in combination, may form all or part of the regeneration fluid stream and may be introduced into regeneration fluid stream 10 in any manner. When slipstream 7 forms all or a portion of regeneration fluid stream 10, prior to its introduction into vessel 6 containing the beds to be regenerated, slipstream 7 can be used to cool one or more recently regenerated adsorbent beds in vessel 8. In cooling such recently-regenerated beds, slipstream 7 is warmed to some extent. Slipstream 7 can then be further warmed by, for example, heat exchanger 9, if necessary, to reach the desired regeneration fluid stream temperature for use during the hot purge step. During the hot purge step, before regeneration fluid stream 10 reaches regeneration vessel 6, a measured amount of water, typically in the form of water vapor, is added to regeneration fluid stream 10 to form a regeneration fluid stream comprising water. Water is added to aid in suppressing coke formation. The point at which the water is added is not critical, and the water addition step may be accomplished by any suitable means. The regeneration fluid stream comprising water is then introduced into the bottom of regeneration vessel 6. In the case where a contaminated hydrocarbon stream is used as part of all of regeneration fluid stream 10, it may not be necessary to add water if the contaminated hydrocarbon stream already contains the desired amount of water. In some embodiments, the regeneration fluid stream comprising water comprises from about 10 ppmv up to about 10,000 ppmv, or from about 10 ppmv up to about 500 ppmv, or from about 50 to about 500 ppmv, or from about 10 ppmv to about 300 ppmv. In other specific embodiments, the regeneration fluid stream comprising water comprises from about 10, or 20, or 30, or 40, or 50 to about 100, or 200, or 300, or 400, or 500, or 600 ppmv water.

In the embodiment illustrated in FIG. 1, a regeneration fluid stream comprising water is introduced during the hot purge into the bottom of regeneration vessel 6 containing adsorbent beds 2a and 3a to be regenerated. Adsorbent beds 2a and 3a consist of molecular sieves and a desiccant material, respectively. The regeneration fluid stream comprising water contacts the desiccant material 3a before it reaches the molecular sieves 2a, and at least a portion of the water in the regeneration fluid stream is adsorbed onto the desiccant material. The regeneration fluid stream comprising water is thus at least partially dried as it exits the desiccant material bed 3a, and the desiccant material is at least partially hydrated by contact with the regeneration fluid stream comprising water. It will be appreciated that the desiccant material may be substantially dry or it may contain some amount of adsorbed water prior to being contacted with the regeneration fluid stream comprising water. In either case, contact with the regeneration fluid stream comprising water increases the adsorbed water content of the desiccant material. After exiting treatment vessel 6, the regeneration fluid stream 10 may be cooled, if desired, in cooler 12 and then passed to regeneration fluid treatment facilities 13 where the fluids used in the regeneration are purified.

During the hot purge step, the at least partially hydrated desiccant material 3a is heated to release adsorbed water into the partially dried regeneration fluid stream while such regeneration fluid stream is passed through the molecular sieves to desorb and remove at least a portion of the contaminants adsorbed on the molecular sieves. In this way, water can be gradually introduced into the molecular sieve adsorbent bed 2a to displace less strongly adsorbed carbon-containing species from the molecular sieves, thereby reducing the extent of decomposition of such species thereon. Exposure of the molecular sieve bed to a sudden rise in water vapor concentration, a condition that can lead to water condensation and deactivation of the molecular sieves, is thus avoided. As noted previously, this advantage is particularly important for protecting the product end of the molecular sieves bed when the regeneration step is performed in a counter-current manner. In the embodiment shown in FIG. 1, which shows a counter-current regeneration, when regeneration vessel 6 is used as a Treat vessel, the product end of molecular sieve bed 2a is the end closest to the desiccant material bed 3a. Further, the above advantage is achieved without the need to resort to more difficult water metering techniques to gradually introduce water vapor. In other methods for regenerating molecular sieves with regeneration fluid streams comprising water, greater care must be taken to ensure that too much water is not added to the regeneration fluid stream. Excess water has the potential to condense in the molecular sieve layer, thereby resulting in deactivation of the molecular sieves. In certain embodiments provided herein, the desiccant material effectively serves as a guard layer for the water-sensitive molecular sieves during regeneration with a regeneration fluid stream comprising water.

Although shown as being in contact with each other in FIG. 1, the molecular sieves and the desiccant material need not be in direct contact with one another, as long as they are in fluid communication with each other through the at least partially dried regeneration fluid stream. That is, there may be other adsorbent beds, zones, or spaces interposed between the adsorbent bed containing the molecular sieves and the adsorbent bed containing the desiccant material, so long as water desorbed from the at least partially hydrated desiccant material can be conducted to the molecular sieves via the at least partially dried regeneration fluid stream. For example, the adsorbent bed containing the molecular sieves and the adsorbent bed containing the desiccant material may be positioned in separate vessels connected by a conduit, or they may be positioned within the same vessel in layered zones.

The heating of the at least partially hydrated desiccant material during the hot purge step can be accomplished by the regeneration fluid stream itself, or it can be accomplished using other heat sources, or by any combination thereof. In the case where the at least partially hydrated desiccant material is heated by passing a heated regeneration fluid stream through the desiccant material, the temperature of the desiccant material can be substantially controlled by adjusting the temperature of the regeneration fluid stream. During at least the initial stages of the regeneration, the temperature of the desiccant material bed should be low enough to permit adsorption of at least a portion of the water contained in the fluid regeneration stream onto the desiccant material. During subsequent stages, the temperature of the regeneration fluid stream is increased and the water content thereof is reduced. The regeneration is completed using a substantially dry regeneration fluid stream at the desired maximum regeneration temperature. In one or more embodiments, the dry regeneration fluid stream and the regeneration fluid stream comprising water have a temperature ranging from about 50° C. and 400° C. In other embodiments the regeneration fluid stream comprising water ranges from about 50° C. to about 150° C., and the dry regeneration fluid stream ranges from about 150° C. to about 400° C.

In some embodiments of the present method, a single bed of molecular sieves replaces beds 2 and 3 in treatment vessel 1, and a single bed of molecular sieves replaces beds 2a and 3a in regeneration vessel 6. In such embodiments, the molecular sieves are regenerated by using a hot purge step that is a staged process in which both the water content and temperature of the regeneration fluid stream are staged. Specifically, the regeneration is carried out by passing a first regeneration fluid stream comprising water through the molecular sieves adsorbent bed for a first period of time while maintaining the temperature of the first regeneration fluid stream in a range of from about 50° C. to about 200° C. In specific embodiments the temperature of the first regeneration fluid stream is maintained in a range having a range minimum of about 50° C., 60° C., 70° C., 80° C., 90° C., 100° C., 110° C., 120° C., 130° C., 140° C., or 150° C. and a range maximum of about 120° C., 130° C., 140° C., 150° C., 160° C., 170° C., 180° C., 190° C., or 200° C. The first regeneration stream comprises 10 ppmv or more of water, alternatively from about 10, or 20, or 30, or 40, or 50 to about 100, or 200, or 300, or 400, or 500, or 600 ppmv water. The regeneration is then continued by passing a second regeneration fluid stream through the molecular sieves adsorbent bed for a second period of time, wherein the second regeneration fluid stream comprises water in an amount less than 20 ppmv, or less than 10 ppmv, or less than 1 ppmv, or less than 0.1 ppmv, with the further proviso that the water content of the first regeneration fluid stream is greater than that of the second regeneration fluid stream. During the second period of time the temperature of said second regeneration fluid stream is maintained in a range of from about 250° C. to about 400° C. Thus, the second regeneration stream is hotter and dryer than the first regeneration fluid stream, and the first regeneration fluid stream is cooler and wetter than the second regeneration fluid stream. After the first and second periods of time have elapsed, the regeneration is completed by cooling the molecular sieves adsorbent bed to a temperature below 250° C. to provide a cooled adsorbent bed containing regenerated molecular sieves. The molecular sieves can then be used to purify a contaminated hydrocarbon stream, such as a raw natural gas stream comprising methanol, by passing the contaminated hydrocarbon stream through the cooled adsorbent bed containing the regenerated molecular sieves to adsorb at least a portion of the contaminants onto the regenerated molecular sieves. If the hydrocarbon stream is natural gas, in one or more embodiments the effluent from the regenerated molecular sieves bed is cooled to a temperature sufficient to produce a liquefied natural gas at atmospheric pressure.

The duration of the first and second periods of time (i.e., the duration of the first and second stages of the hot purge step) referred to above for embodiments utilizing only a single bed containing molecular sieves can be for any suitable lengths of time, but the duration of the first stage is typically in the range of about 10 minutes to about 36 hours, alternatively from about 2 hours to 36 hours. The duration of the second stage is typically about 60 minutes to about 12 hours, alternatively from about 2 hours to about 12 hours. In a specific embodiment, the hot purge step has a total duration of about two hours (124 minutes), and the first stage has a duration of about 20 minutes to about 60 minutes, and the second stage has a duration of about 60 minutes to about 104 minutes. The durations of the first and second stages can also be expressed as percentages of the total duration of the hot purge stage. Thus, in some embodiments, the duration of the first stage is from about 15 percent to about 50 percent of the total hot purge time, or from about 20 percent to about 50 percent, or from about 25 percent to about 50 percent, or from about 15 percent to about 25 percent, or from about 15 percent to about 30 percent, or from about 15 percent to about 40 percent. Likewise, in some embodiments the duration of the second stage is from about 50 percent to about 85 percent of the total hot purge time, or from about 50 percent to about 80 percent, or about 50 percent to about 75 percent, or about 75 percent to about 85 percent, or about 70 percent to about 85 percent, or about 60 percent to about 85 percent. In a specific embodiment, the conditions and durations of the first and second stages are any combination of those set forth above, except that the water content of the regeneration fluid stream in the second stage is zero or approximately zero.

In an alternative embodiment, a bed of molecular sieves is positioned within a treatment vessel to create a first adsorbent bed containing molecular sieves and a second bed consisting of a desiccant material is positioned within the same vessel upstream of the first adsorbent bed with respect to the flow direction of the contaminated hydrocarbon stream. In this embodiment, in the case where the flow direction of the contaminated hydrocarbon stream is downward, the bed containing desiccant material will be positioned above the molecular sieve bed. During regeneration, the regeneration fluid stream is passed through the adsorbent beds in a co-current manner, and the regeneration fluid stream comprising water will contact a desiccant material adsorption bed prior to contacting the molecular sieve adsorption bed. The desiccant material bed again acts a guard layer to adsorb and release water in a gradual and controlled manner as described above.

In another embodiment, a first bed containing desiccant material is positioned within a treatment vessel. A second bed containing molecular sieves is positioned below the first bed containing desiccant material, and a third bed containing desiccant material is positioned below the molecular sieves bed. As before, the flow of the contaminated hydrocarbon stream can be in either an upward or downward direction, but in the case where the flow is downward and regeneration is carried out counter-currently, the third bed, which contains desiccant material and is located in the base of the treatment vessel, will be the first adsorbent bed contacted by the regeneration fluid stream comprising water. The first bed, consisting of desiccant material, will be located upstream of the molecular sieves bed during the treatment step and will thus be the first bed contacted by the contaminated hydrocarbon stream. As in the above embodiments, the third bed containing desiccant material serves as a guard layer, as described above, for the water-sensitive product-end of the molecular sieve zone. The first bed consisting of desiccant material serves as a preliminary adsorbent bed (i.e., a preliminary adsorption bed) to remove substantial amounts of contaminants, such as methanol and water, before the contaminated hydrocarbon stream enters the molecular sieve bed. Removal of some water from the contaminated hydrocarbon stream prior to its entry into the molecular sieve bed reduces the water removal load of the molecular sieves. It will be appreciated that in the case where the flow direction of the contaminated hydrocarbon stream is upward, the third bed, consisting of desiccant material, will serve as the preliminary adsorbent bed, and the first bed, also consisting of desiccant material, will serve as the water guard layer in the case of a counter-current regeneration. In one or more embodiments, the preliminary adsorbent bed consists of silica gel, which can preferentially adsorb heavy hydrocarbons in addition to the aforementioned contaminants. Accordingly, in some embodiments the inventive method comprises: passing a hydrocarbon stream comprising contaminants through a first adsorption bed containing a desiccant material; passing the effluent from the first adsorption bed into a second adsorption bed containing molecular sieves to adsorb at least a portion of the contaminants onto the molecular sieves; passing the effluent from the second adsorption bed into a third adsorption bed containing desiccant material; and regenerating the molecular sieve adsorption bed by purging at least the second and third beds, or at least the first and second beds, with a regeneration fluid stream comprising water to desorb and remove at least a portion of the contaminants adsorbed on the molecular sieves, the regeneration fluid stream comprising water contacting either the first adsorption bed containing desiccant material or the third adsorption bed containing desiccant material prior to contacting the second adsorption bed containing molecular sieves.

The sizes of the various vessels and adsorbent beds used in embodiments of the present invention are not critical, and the dimensions of such beds may be selected based on specific needs. In some embodiments, the total adsorbent bed height (L) is from about 4 meters to about 10 meters, or from about 5 meters to about 8 meters. In some embodiments, the diameter of the adsorbent bed (D) is from about 2 to about 4 meters. In some embodiments, the length of the second adsorbent bed containing desiccant material (L2) and the length of the first adsorbent bed containing molecular sieves (L1) are such that the ratio L2/L1 is about 1.0 or lower, alternatively about 0.5 or lower, alternatively about 0.3 or lower. In other embodiments, the combined lengths of adsorbent beds containing desiccant material ($L_D$) and the length of said first adsorbent bed (L1) are such that the ratio $L_D$/L1 is about 1.0 or lower, alternatively about 0.5 or lower, alternatively about 0.3 or lower.

In some embodiments, the regeneration is carried out using a temperature profile during the hot purge such that the initial temperature of the regeneration fluid stream is less than about 200° C., alternatively from about 100° C. to about 150° C., alternatively less than about 100° C. The lower initial temperature is beneficial as it lowers the average overall temperature during regeneration, thereby decreasing thermal stress and gradients and potentially leading to a longer lifetime for the molecular sieves. In some embodiments of the method disclosed herein, the use of an adsorbent bed containing desiccant material in combination with a molecular sieve bed permits the use of lower initial regeneration temperatures (and thus lower overall regeneration temperatures) compared to other methods for regenerating molecular sieves using regeneration fluid streams comprising water, while at the same time maintaining product quality. For example, where the desiccant material is selected such that it has a heat of water adsorption that is lower than the heat of water adsorption for the molecular sieves, such desiccant materials will not hold water as strongly as molecular sieves. Consequently, more moderate temperatures serve/suffice to desorb them from the adsorbent structure. This advantage is particularly pronounced for smaller adsorbent beds as discussed below.

While lower regeneration temperatures are desirable for the reason described herein, such lower temperatures will generally result in a regenerated molecular sieve adsorbent that has a lower overall capacity. One way to overcome this problem would be to increase the adsorbent bed size, since, as is well known, at a given raw gas or fluid flow rate and contaminant level, the larger the adsorbent bed, the more adsorption capacity the bed has. Thus, if lower regeneration temperatures are used, one way to ensure that a particular contaminant, such as methanol, is reduced to an acceptably low level would be to increase the adsorbent bed size. This approach has significant disadvantages, however, most notably the increased cost of adsorbent. In addition, larger adsorbent beds have larger heat capacities and thus require more heat energy during regeneration, and, conversely more heat energy must be removed during bed cooling. In addition, in practice a limit exists on the diameter of the vessels that can be used as treatment vessels, because of limitations on the size of vessels that can be shipped, and also because of concerns about adequate thermal distribution and control of heat losses. Practical limits also exist with respect to treatment vessel height. To accommodate larger adsorbent volumes with a fixed number of on-stream vessels having a given diameter, the adsorbent bed height of each vessel must be increased. However, the height of treatment vessels (and the height of the corresponding adsorption beds) also cannot be extended without limit due to the increased pressure drop that results from increased bed height. Further, for larger bed heights, it may be difficult to achieve adequate packing of the adsorbent while also avoiding crushing of the lower layers of the adsorbent. For these reasons, it is desirable to use a smaller adsorbent bed if possible, provided that the product contaminant specification can be met. It has been found that the use of a regeneration fluid stream comprising water, in combination with a first adsorbent bed containing molecular sieves and a second adsorbent bed containing a desiccant material, permits the use of both smaller adsorbent beds and lower overall regeneration temperatures, while at the same time producing a product having a methanol contaminant level of 0.5 ppmv or lower. These advantages results can be obtained by, for example, using a staged regeneration process as described below.

Accordingly, in specific embodiments utilizing a first adsorbent bed containing molecular sieves and at least a second adsorbent bed containing a desiccant material, the methods described herein employ a regeneration in which the "hot purge" step comprises at least two heating stages: (1) a first relatively low temperature stage in which the temperature of the regeneration fluid stream comprising water is maintained in a range of from about 50° C. to about 200° C., or about 50° C. to about 190° C., or about 50° C. to about 180° C., or about 50° C. to about 170° C., or about 50° C. to about 150° C., or about 50° C. to about 100° C., or about 60° C. to about 170° C., or about 80° C. to about 150° C.; and (2) a second stage in which the temperature of the regeneration fluid stream, which may be dry or may optionally comprise water, is maintained in a range of from about 250° C. to about 400° C., or about 250° C. to about 350° C., or about 250° C. to about 300° C. In an alternative such embodiment, the temperature of the regeneration fluid stream in the first stage is above 50° C. and below 175° C. In still other such embodiments, the temperature of the regeneration fluid stream in the first stage is maintained in a range having a range minimum of about 50° C., 60° C., 70° C., 80° C., 90° C., 100° C., 110° C., 120° C., 130° C., 140° C., or 150° C. and a range maximum of about 120° C., 130° C., 140° C., 150° C., 160° C., 170° C., 180° C., 190° C., or 200° C. In one or more such embodiments, in the first stage the regeneration fluid stream comprises from about 10 ppmv to about 250 ppmv of water, or about 10 ppmv to about 150 ppmv of water, or about 10 ppmv to about 100 ppmv of water. Alternatively, the regeneration fluid stream in the first stage comprises from about 10, or 20, or 30, or 40, or 50 to about 100, or 200, or 300, or 400, or 500, or 600 ppmv water. In the second stage, the regeneration fluid stream may be essentially dry, or it may comprise water in an amount that is less than the water content in the first stage. In one or more embodiments, the regeneration fluid stream during the second stage comprises from about 10 ppmv to about 100 ppmv, or about 10 ppmv to about 50 ppmv, or about 10 ppmv to about 30 ppmv, or from 0 to 20 ppmv water.

The durations of the first and second stages can be any suitable lengths of time, but the duration of the first stage is typically in the range of about 10 minutes to about 36 hours, alternatively from about 2 hours to 36 hours. The duration of the second stage is typically about 60 minutes to about 12 hours, alternatively from about 2 hours to about 12 hours. In a specific embodiment of the staged regeneration according to the present method, the hot purge step has a total duration of about two hours (124 minutes), and the first stage has a duration of about 20 minutes to about 60 minutes, and the second stage has a duration of about 60 minutes to about 104 minutes. The durations of the first and second stages can also be expressed as percentages of the total duration of the hot purge stage. Thus, in some embodiments, the duration of the first stage is from about 15 percent to about 50 percent of the total hot purge time, or from about 20 percent to about 50 percent, or from about 25 percent to about 50 percent, or from about 15 percent to about 25 percent, or from about 15 percent to about 30 percent, or from about 15 percent to about 40 percent. Likewise, in some embodiments the duration of the second stage is from about 50 percent to about 85 percent of the total hot purge time, or from about 50 percent to about 80 percent, or about 50 percent to about 75 percent, or about 75 percent to about 85 percent, or about 70 percent to about 85 percent, or about 60 percent to about 85 percent. In a specific embodiment, the conditions and durations of the first and second stages are any combination of those set forth above, except that the water content of the regeneration fluid stream in the second stage is zero or approximately zero.

The molecular sieves that can be used in embodiments of the invention are any of those that are capable of adsorbing water, methanol, glycols, $CO_2$, $H_2S$, mercaptans, and other sulfur compounds commonly contaminating hydrocarbon streams, such as COS. Such molecular sieves are well known in the industry and comprise crystalline zeolites having the basic formula $M_{2/n}O.Al_2O_3.xSiO_2.yH_2O$ where M is a cation of valence n. Specific examples of suitable molecular sieves include 13X, 5A, 4A, high silica zeolite such as silicalite, other metal combinations, NaY, combinations of these, and also combinations of these with composites formed from combinations of these. Desiccant materials useful in embodiments of the invention are any of those capable of reversibly adsorbing water. In some embodiments, the desiccant material is selected from the group consisting of metal oxides and activated carbon. In other embodiments the desiccant material is selected from the group consisting of silica and the oxides of the metals in Groups 1, 2, 4, and 13 of the periodic table (designated under the previous IUPAC form as Groups 1A, IIA, IVA, IIIB, and IVB, respectively, as described in *Chemical and Engineering News*, 63(5), 27, 1985). Specific examples of such desiccant materials include, but are not limited to, sodium and potassium oxides, calcium oxide, titanium dioxide (titania), zirconium dioxide (zirconia), alumina, and silica. In a specific embodiment the desiccant material is selected from the group consisting of alumina, silica, calcium oxide, and titania. In another specific embodiment the desiccant material is selected from the group consisting of alumina and silica. In a further embodiment, the desiccant material is alumina. In other embodiments, the desiccant material may be any desiccant having a heat of hydration less than the heat of hydration of the molecular sieves contained in the molecular sieve adsorption bed. Any of the desiccant materials described above may be employed in any of the embodiments of the invention described herein.

The physical form of the desiccant material useful in embodiments of the invention is not critical. The desiccant materials may be in liquid form or in solid form, for example in solid particulate or pellet form. "Solid" form materials as defined herein include solids that are porous or that have voids and/or interstices or the like throughout all or part of the material. Thus, it will be understood that the term "solid" does not necessarily denote a material that is uniformly solid and/or non-porous, although such materials are within the scope of solid materials that may be employed as the desiccant material. In the case where a particulate metal oxide is selected as the desiccant material, such as, for example, particulate alumina or silica, the average particle size of the desiccant material may be in the range of about 0.7 to about 6 mm, with a surface area of about 75 to about 500 m2/gm. In some embodiments the desiccant material is selected from the group consisting of alumina, silica gel, and titania. Where two or more adsorbent beds containing a desiccant material are used, the desiccant materials for each bed may be the same or different. For example, some embodiments utilize first and third adsorbent beds containing alumina as the desiccant material, with a second adsorbent bed containing molecular sieves located between the two alumina adsorbent beds. In still other embodiments the first bed contains silica gel and the third adsorbent bed contains a desiccant material comprising alumina. In some embodiments the first adsorbent bed containing silica serves as a preliminary adsorbent bed (i.e., a preliminary adsorption bed) to remove substantial amounts of contaminants, such as methanol and water, before the contaminated hydrocarbon stream enters the molecular sieve bed.

The forgoing embodiments may be usefully employed in removing methanol from natural gas streams. As previously noted, methanol is often added as a hydrate inhibitor to natural gas streams, and it is necessary to substantially remove such methanol prior to liquefaction of the natural gas to produce liquefied natural gas (LNG). A methanol-contaminated natural gas stream is passed through a first adsorbent bed comprising molecular sieves to adsorb methanol on the molecular sieves. Thereafter the methanol-laden molecular sieves are regenerated by passing a regeneration fluid stream comprising water vapor at a temperature of 50° C. to 400° C. to desorb and remove methanol adsorbed on said molecular sieves.

In one or more embodiments, methanol is removed from natural gas utilizing molecular sieves that have been regenerated using a staged regeneration as described herein. In such embodiments, a natural gas stream comprising methanol is passed through a first adsorbent bed containing molecular sieves to adsorb at least a portion of the methanol onto the molecular sieves. The effluent from the first adsorbent bed is passed through a second adsorbent bed containing a desiccant material. When it becomes necessary to regenerate the beds, a first regeneration fluid stream comprising water is passed counter-currently through the first and second adsorbent beds for a first period of time, while the temperature of the first regeneration fluid stream is maintained in a range of from about 50° C. to about 200° C. The amount of water used in such first regeneration fluid stream can be any of the amounts specified in any of the embodiments described herein. A second regeneration fluid stream is then passed counter-currently through the first and second adsorbent beds for a second period of time, wherein said second regeneration fluid stream comprises water in an amount typically less than 10 ppmv, or less than 1 ppmv, or less than 0.1 ppmv, or zero ppmv. During such second period of time, the temperature of the second regeneration fluid stream is maintained in a range of from about 250° C. to about 400° C. The first and second adsorption beds are then cooled to a temperature below 250° C. In this way, an adsorbent bed containing regenerated molecular sieves is provided. The molecular sieves thus regenerated will have a reduced level of methanol adsorbed thereon and can be reused to treat additional natural gas comprising methanol.

Any of the other embodiments discussed herein may also be usefully employed in producing a liquefied natural gas. Accordingly, in one or more embodiments of the invention a method is provided for producing a liquefied natural gas utilizing any of the foregoing embodiments of the invention. For example, a contaminated natural gas stream is provided and optionally passed through a first adsorbent bed containing a desiccant material. The contaminated natural gas stream, or, optionally, the effluent from the first adsorbent bed, is then passed through a second adsorbent bed containing molecular sieves regenerated according to any of the methods of regeneration disclosed herein, thereby producing a natural gas stream having a reduced contaminant content. Thereafter, optionally, the natural gas stream having a reduced contaminant content is passed through a third adsorbent bed comprising a desiccant material, and the effluent from the second or, alternatively, from the third adsorbent bed is recovered, followed by cooling the effluent to a temperature sufficient to produce a liquefied natural gas at atmospheric pressure. In one or more embodiments of the present method for producing a liquefied natural gas, the contaminated hydrocarbon stream comprises methanol as a contaminant, and the molecular sieves have at least methanol adsorbed thereon prior to regeneration.

In a further embodiment of the method for producing LNG as described herein, a first adsorbent bed containing methanol-laden molecular sieves (i.e., the molecular sieves have methanol adsorbed thereon) and a second adsorbent bed containing a desiccant material are regenerated by passing a first regeneration fluid stream comprising water counter-currently through the first and second adsorbent beds for a first period of time. During such first period of time, the temperature of the first regeneration fluid stream is maintained in a range of from about 50° C. to about 200° C., or in specific embodiments, within a range having a range minimum of about 50° C., 60° C., 70° C., 80° C., 90° C., 100° C., 110° C., 120° C., 130° C., 140° C., or 150° C. and a range maximum of about 120° C., 130° C., 140° C., 150° C., 160° C., 170° C., 180° C., 190° C., or 200° C. The first regeneration stream comprises 10 ppmv or more of water, alternatively from about 10, or 20, or 30, or 40, or 50 to about 100, or 200, or 300, or 400, or 500, or 600 ppmv water. A second regeneration fluid stream is then passed counter-currently through the first and second adsorbent beds for a second period of time, wherein said second regeneration fluid stream comprises water in an amount less than 20 ppmv, or less than 15 ppmv, or less than 10 ppmv, or less 1 ppmv, or less than 0.1 ppmv, or zero ppmv. During the second period of time, the temperature of the second regeneration fluid stream is maintained in a range of from about 250° C. to about 400° C. Thereafter, the adsorbent beds are cooled to a temperature below 250° C. to provide a cooled adsorbent bed containing regenerated molecular sieves. The molecular sieves thus regenerated will have a reduced level of methanol adsorbed thereon and can be reused to treat additional natural gas comprising methanol. Accordingly, a natural gas stream comprising methanol is then passed through the cooled adsorbent bed containing regenerated molecular sieves to adsorb at least a portion of the methanol onto the regenerated molecular sieves. The effluent from the cooled adsorbent bed containing the regenerated molecular sieves is also passed through an adsorbent bed containing a desiccant material. The desiccant material may be fresh desiccant material or it may be regenerated desiccant material. The effluent from the adsorbent bed containing desiccant material is then cooled to a temperature sufficient to produce a liquefied natural gas at atmospheric pressure.

EXAMPLES

The following examples are illustrative. The examples below are computer simulations of embodiments described above carried out to illustrate embodiments of the invention or to provide a comparative example (Example 7) as indicated below and in Table 1. The computer simulations use fundamental information on the contaminant-adsorbent interactions and numerically solve the governing material balances during each step of the purification process. In each example, the computer simulation was run with the following input parameters: 1300 MMSCFD (1534 kNm$^3$/hr) of a raw (contaminated) natural gas at 66.5 bara and 25° C., comprising mostly light hydrocarbons 86 mol % methane, 5 mol % ethane, and lesser amounts of heavier hydrocarbons, namely 2 mol % propane, 1 mol % butane, 0.35 mol % pentane and 0.1 mol % hexane, remaining C7+ hydrocarbons and containing 780 ppmv water and 50 ppmv methanol as contaminants was treated in a four-vessel configuration using a typical cycle. Except as noted below and in Table 1, each vessel has an inner diameter such that the adsorbent bed diameters are 2.4 m and the total adsorbent height is 8.3 m. The treatment cycle consists of a feed step for a duration of 600 minutes. The regeneration consists of depressurization for 30 minutes, followed by a hot purge step having a duration of 124 minutes, a cold purge having a duration of 105 minutes, and a repressurization step having a duration of 30 minutes. Regeneration was counter-current to feed in each of the examples to maintain quality of the product end of the vessel. In each example, the regeneration fluid stream (i.e., the regeneration purge gas) consisted of 81 MMSCFD (96 kNm$^3$/hr) of gas at 27.50 bara in each of the hot and cold purge steps. The composition of the regeneration fluid stream was, in all of the examples, entirely methane or entirely methane and water. Other than water, there were no contaminants in the regeneration gas. Also, in all of the simulations, the cold regeneration is performed at temperature 25° C. The target concentrations of methanol and water contaminants in the product (defined as the treated gas issuing from the treatment vessel (or vessels) during the feed step) are as follows: [a]<5 ppmv for water, in some embodiments as low as 0.1-0.5 ppmv and [b]<1 ppmv for methanol, in some embodiments as low as 0.1-0.5 ppmv. The results of the examples are summarized in Table 1. In Table 1, the symbols have the following meanings: "L" is the sum of the lengths, in meters (m), of the adsorbent bed or beds; "D" is the diameter, in meters, of the adsorbent bed or beds; "T1" and "T2" are the temperatures, in degrees centigrade, of the fluid regeneration streams used in the first stage and second stages, respectively, of the hot purge portion of the adsorbent bed(s) regeneration; "t1" and "t2" are the respective durations, in minutes (min) of the first and second stages of the hot purge portion of the regeneration; and "w1" and "w2" are, respectively, the amount of water vapor (in parts-per-million-by-volume, ppmv) in the regeneration fluid stream in the first and second stages of the hot purge portion of the regeneration.

Example 1

An adsorbent configuration consisting entirely of a single bed of molecular sieve was subjected to the above cycle and conditions. The length of the molecular sieve adsorbent bed is 8.3 m. Three different combinations of first and second stage durations were used in the hot purge portion of the regeneration, corresponding to Examples 1a, 1b, and 1c, as follows:

1a

A hot purge first stage temperature of 127° C. was maintained for 20 minutes (t1=20 minutes) using a regeneration fluid stream comprising 10 ppmv water, followed by a second stage with T2=287° C. and t2=104 minutes. The water content of the regeneration fluid stream used in the second stage (w2) was zero. The bed thus regenerated produced a product during the subsequent feed cycle containing 0.038 ppmv methanol and 0.025 ppmv water.

1b

Example 1a was repeated, except that t1 was 25 minutes and t2 was 99 minutes. The bed thus regenerated produced a product during the subsequent feed cycle containing 0.17 ppmv methanol and 0.018 ppmv water.

1c

Example 1a was repeated, except that t1 was 35 minutes and t2 was 89 minutes. The bed thus regenerated produced a product during the subsequent feed cycle containing 0.97 ppmv methanol and 0.04 ppmv water.

Example 2

An adsorbent configuration consisting of a molecular sieve bed followed by an alumina bed, arranged in the direction of the feed gas (i.e., the alumina bed was positioned in the same treatment vessel downstream of the molecular sieve bed) was subjected to the above cycle and conditions. The length occupied by the alumina adsorbent bed is 24% of total adsorbent length, L, which was 8.3 m. Thus, the molecular sieve bed had a length (L1) of about 6.3 m and the alumina bed had a length (L2) of about 2 m. Three different combinations of first and second stage durations were used in the hot purge portion of the reintegration as follows:

2a

A hot purge first stage temperature of 127° C. was maintained for 20 minutes (t1=20 minutes) using a regeneration fluid stream comprising 10 ppmv water, followed by a second stage with T2=287° C. and t2=104 minutes. The water content of the regeneration fluid stream used in the second stage (w2) was zero. The bed thus regenerated produced a product during the subsequent feed cycle containing 0.041 ppmv methanol and 0.0013 ppmv water.

2b

Example 2a was repeated, except that t1 was 40 minutes and t2 was 84 minutes. The bed thus regenerated produced a product during the subsequent feed cycle containing 0.22 ppmv methanol and 0.0055 ppmv water.

2c

Example 1a was repeated, except that t1 was 50 minutes and t2 was 74 minutes. The bed thus regenerated produced a product during the subsequent feed cycle containing 0.55 ppmv methanol and 0.034 ppmv water.

The additional examples below further illustrate embodiments of the invention, utilizing an increased amount of water in the regeneration fluid stream.

Example 3

Example 3 illustrates the use of a water content of 100 ppmv of water in the regeneration fluid stream for a bed consisting entirely of molecular sieves and having the same dimension as the beds employed in the above examples. The feed flow rate was 893 MMSCFD. Otherwise, the conditions were the same as in the previous examples. Two different values of the first stage duration time (t1) are used: in Example 3a, t1 is 40 minutes, and in Example 3b, t1 is 60 minutes. The hot purge regeneration temperatures employed in Example 3 are similar to, but slightly different from, the temperatures employed in Example 2 and Example 1. The regenerated bed produced a product during the subsequent feed cycle containing the methanol and water levels shown in Table 1.

Example 4

Examples 4a and 4b illustrate additional embodiments of the inventive method. The water content of the regeneration fluid stream and other variables were the same as for Example 3 (as shown in Table 1), except that an adsorbent bed of alumina was used in conjunction with a molecular sieve bed and wet regeneration step. Two different alumina bed lengths were used.

Example 5

An adsorbent configuration consisting entirely of an adsorbent bed of molecular sieve was subjected to the cycle and conditions used in Examples 1 and 2, except that the vessel has an inner diameter (D) of 2 m, and the total adsorbent height (L) is 5 m. Three cases, corresponding to Examples 5a-5c were evaluated.

5a

A hot purge first stage temperature of 327° C. was maintained for 60 minutes (t1=20 minutes) using a regeneration fluid stream comprising 100 ppmv water, followed by a second stage with T2=400° C. and t2=64 minutes. The water content of the regeneration fluid stream used in the second stage (w2) was zero. The bed thus regenerated produced a product during the subsequent feed cycle containing 0.020 ppmv methanol and 0.0040 ppmv water.

5b

Example 5a was repeated, except that T1 was decreased to 277° C. The bed thus regenerated produced a product during the subsequent feed cycle containing 0.050 ppmv methanol and 0.0069 ppmv water.

5c

Example 5a was repeated, except that T1 was decreased further to 227° C. The bed thus regenerated produced a product during the subsequent feed cycle containing 31 ppmv methanol and 0.070 ppmv water.

Example 6

Examples 6a and 6b illustrate further embodiments of the inventive method. An adsorbent configuration consisting of an adsorbent bed of molecular sieve followed by an adsorbent bed of alumina arranged in the direction of the feed gas, i.e., arranged such that the alumina bed is downstream of the molecular sieve bed, was subjected to the same cycle, conditions and with the same bed dimensions as in Examples 5a, 5b, and 5c, except that the overall temperature of regeneration was reduced by lowering T1 as shown in Table 1. The value of T1 was 127° C. in Example 6a and 87° C. in Example 6b. The length of the alumina adsorbent bed (L2) was 36% of total adsorbent length (L). The total adsorbent bed length was 5 meters, giving an L2 value (alumina bed) of 1.8 meters and an L1 value (molecular sieve bed) of 3.2 meters. As shown in Table 1, the beds regenerated according to Examples 6a and 6b produced products during the subsequent feed cycle containing, respectively: 0.37 ppmv methanol and 0.12 ppmv water; and 0.51 ppmv methanol and 0.27 ppmv water.

Comparative Example 7

An adsorbent configuration consisting of molecular sieve followed by alumina, arranged in the direction of the feed gas, was subjected to the cycle and conditions described above, for Example 1. The length occupied by the alumina portion is 12% of total adsorbent length=8.3 m. Regeneration was performed with dry gas at 287° C. for the entire duration of the hot regeneration step of 124 minutes. For this configuration and cycle, the product has 0.029 ppmv methanol and 0.0002 ppmv water. However, this example illustrates the case where the adsorbents are subjected to extreme temperature for extended time. Such a manner of operation leads to early degradation of the adsorbents and reduced life. This is also an example of uncontrolled heating during regeneration which further creates conditions for the decomposition of methanol, leading to reduced adsorbent life due to coking.

The following examples illustrate the ability of the inventive method to control the regeneration so as to reduce the intensity and severity of the regeneration while also continuing to meet the product specification. The following parameters were varied in comparison to Comparative Example 7: [a] The hot purge portion was divided into two stages having independent durations and different water concentrations (from 0 ppmv to 600 ppmv) and different intermediate temperatures (from 67° C. to 187° C.) were applied to the first stage. The final temperature (287° C.) was kept fixed as in Comparative Example 7. The relative amounts of time for each stage were also varied by keeping the total hot purge time fixed at 124 minutes as in Comparative Example 7 and varying the first stage duration from 20 minutes to 60 minutes.

Example 8

In this example the configuration and cycle of Comparative Example 7 was used, i.e., with 12% alumina in the base. A wet heating step of 127° C. for 20 minutes was followed by a dry heating step of 287° C. for 104 minutes. Only the amount of water applied in the first step was varied in Examples 8a through 8c below. This example of the introduction of water to an alumina zone during regeneration of molecular sieves is a novel aspect and one embodiment of the present invention.

8a

Wet heating step using 10 ppmv water. The bed thus regenerated produced a product during the subsequent feed cycle containing 0.36 ppmv methanol and 0.01 ppmv water.

8b

Wet heating step using 300 ppmv water. The bed thus regenerated produced a product during the subsequent feed cycle containing 0.4 ppmv methanol and 0.1 ppmv water.

8c

Wet heating step using 600 ppmv water. The bed thus regenerated produced a product during the subsequent feed cycle containing 0.7 ppmv methanol and 0.3 ppmv water.

Examples 8a and 8b illustrate that methanol and water product specifications are satisfied even when water is added during regeneration for the bed configuration that uses desiccant in the second zone. The addition of water in conjunction with the reduced temperature of the first step (127° C.) contributes to reducing decomposition and coke formation. Example 8c shows that there is an upper limit on the amount of water that can be introduced before the product specification exceed prescribed limits (e.g. 0.5 ppmv for methanol), all other conditions being the same as in example 8a, 8b. Those of skill in the art will appreciate that the upper water limit will be dependent upon the size of the treatment and regeneration vessels, the duration of the hot purge step and the individual durations of the first and second stages where the hot purge step is carried out in two stages, and other factors.

Example 9

In this example the configuration and cycle of Comparative Example 7 was used, but alumina was increased to 24% in the base of the vessel. In addition the first heating step was conducted at 67° C. for 60 minutes using 100 ppmv water. The second heating step was at 287° C. for 64 minutes. Once again the resultant product had 0.17 ppmv methanol and 0.0043 ppmv water. The reduction in intensity of regeneration (by 120° C. for almost half the hot regeneration time) is expected to have a beneficial effect on sieve life expectancy. In addition the use of significant amount of water further mitigates the methanol decomposition reactions. The use of alumina ensures that product specification is maintained simultaneously with these life-extending procedures.

Example 10

In this example the configuration and cycle of Comparative Example 7 were used, with alumina increased to 24% in the base of the vessel. In addition the first heating step was conducted at 187° C. for 60 minutes using 100 ppmv water. The second heating step was at 287° C. for 64 minutes. The resultant product had 0.23 ppmv methanol and 0.10 ppmv water, which are in accordance with the specification. As will be appreciated by those skilled in the art, the reduction in intensity of regeneration (by 100° C. for about half the total hot regeneration duration of 124 min) has a beneficial effect on sieve life expectancy. Also shown in Table 1 is a duplicate run of Example 10 using a different convergence factor in the computer simulation. The resultant methanol and water levels in the duplicate run were 0.31 and 0.5 ppmv, respectively.

Example 11

In this example a first bed containing desiccant material is positioned within a treatment vessel. A second bed containing molecular sieves is positioned below the first bed containing desiccant material, and a third bed containing desiccant material is positioned below the molecular sieves bed. Three cases are used. In each case an alumina layer of about 12% length is used in both the top and base of the vessel, with molecular sieve occupying the central portion of the vessel. In this particular embodiment, the top layer of alumina serves as a preliminary adsorbent bed (i.e., a preliminary adsorption bed) to remove substantial amounts of contaminants, such as methanol and water, before the contaminated hydrocarbon stream enters the molecular sieve bed.

Example 11a

A heating step of 127° C. for 20 minutes using 100 ppmv water was followed by a dry heating step of 287° C. for 104 minutes. The product from this embodiment of the invention contains 0.005 ppmv methanol and 0.24 ppmv water.

Example 11b

A heating step of 127° C. for 30 minutes using 100 ppmv water was followed by a heating step of 287° C. for 94 minutes using 10 ppmv water. The product from this embodiment of the invention contains 0.0063 ppmv methanol and 0.12 ppmv water.

Example 11c

A heating step of 147° C. for 30 minutes using 10 ppmv water was followed by a dry heating step of 287° C. for 94 minutes. The product from this embodiment of the invention contains 0.012 ppmv methanol and 0.05 ppmv water.

TABLE 1

| Example | Preliminary zone (Desiccant material) % of total length | First zone (Molecular sieve) % of total length | Second zone (Desiccant material) % of total length | L m | D m | T1 deg C. | t1 min | w1 ppmv | T2 deg C. | t2 min | w2 ppmv | Methanol in product ppmv | Water in product ppmv |
|---|---|---|---|---|---|---|---|---|---|---|---|---|---|
| 1a | 0 | 100 | 0 | 8.3 | 2.4 | 127 | 20 | 10 | 287 | 104 | 0 | 0.038 | 0.025 |
| 1b | 0 | 100 | 0 | 8.3 | 2.4 | 127 | 25 | 10 | 287 | 99 | 0 | 0.17 | 0.018 |
| 1c | 0 | 100 | 0 | 8.3 | 2.4 | 127 | 35 | 10 | 287 | 89 | 0 | 0.97 | 0.04 |
| 2a | 0 | 76 | 24 | 8.3 | 2.4 | 127 | 20 | 10 | 287 | 104 | 0 | 0.041 | 0.0013 |
| 2b | 0 | 76 | 24 | 8.3 | 2.4 | 127 | 40 | 10 | 287 | 84 | 0 | 0.22 | 0.0055 |
| 2c | 0 | 76 | 24 | 8.3 | 2.4 | 127 | 50 | 10 | 287 | 74 | 0 | 0.55 | 0.034 |
| 3a | 0 | 100 | 0 | 8.3 | 2.4 | 121 | 40 | 100 | 288 | 84 | 0 | 0.050 | 0.16 |
| 3b | 0 | 100 | 0 | 8.3 | 2.4 | 121 | 60 | 100 | 288 | 64 | 0 | 0.50 | 0.35 |
| 4a | 0 | 88 | 12 | 8.3 | 2.4 | 121 | 40 | 100 | 288 | 84 | 0 | 0.010 | 0.44 |
| 4b | 0 | 76 | 24 | 8.3 | 2.4 | 121 | 60 | 100 | 288 | 64 | 0 | 0.16 | 0.55 |
| 5a | 0 | 100 | 0 | 5.0 | 2.0 | 327 | 60 | 100 | 400 | 64 | 0 | 0.020 | 0.0040 |
| 5b | 0 | 100 | 0 | 5.0 | 2.0 | 277 | 60 | 100 | 400 | 64 | 0 | 0.050 | 0.0069 |
| 5c | 0 | 100 | 0 | 5.0 | 2.0 | 227 | 60 | 100 | 400 | 64 | 0 | 31 | 0.070 |
| 6a | 0 | 64 | 36 | 5.0 | 2.0 | 127 | 60 | 100 | 400 | 64 | 0 | 0.37 | 0.12 |
| 6b | 0 | 64 | 36 | 5.0 | 2.0 | 87 | 60 | 100 | 400 | 64 | 0 | 0.51 | 0.27 |
| Comparative 7 | 0 | 88 | 12 | 8.3 | 2.4 | 287 | 62 | 0 | 287 | 62 | 0 | 0.029 | 0.0002 |
| 8a | 0 | 88 | 12 | 8.3 | 2.4 | 127 | 20 | 10 | 287 | 104 | 0 | 0.36 | 0.01 |
| 8b | 0 | 88 | 12 | 8.3 | 2.4 | 127 | 20 | 300 | 287 | 104 | 0 | 0.4 | 0.1 |
| 8c | 0 | 88 | 12 | 8.3 | 2.4 | 127 | 20 | 600 | 287 | 104 | 0 | 0.7 | 0.3 |
| 9 | 0 | 76 | 24 | 8.3 | 2.4 | 67 | 30 | 10 | 287 | 94 | 0 | 0.17 | 0.0043 |
| 10 | 0 | 76 | 24 | 8.3 | 2.4 | 187 | 60 | 100 | 287 | 64 | 0 | 0.23 | 0.10 |
| Duplicate 10 | 0 | 76 | 24 | 8.3 | 2.4 | 127 | 60 | 100 | 287 | 64 | 0 | 0.31 | 0.5 |
| 11a | 12 | 76 | 12 | 8.3 | 2.4 | 127 | 20 | 100 | 287 | 104 | 0 | 0.005 | 0.24 |
| 11b | 12 | 76 | 12 | 8.3 | 2.4 | 127 | 30 | 100 | 287 | 94 | 10 | 0.0063 | 0.12 |
| 11c | 12 | 76 | 12 | 8.3 | 2.4 | 147 | 30 | 10 | 287 | 94 | 0 | 0.012 | 0.05 |

The inventive examples shown in Table 1 illustrating the use of desiccant materials, such as alumina, or a combination of staged temperatures and staged water contents, in conjunction with a fluid regeneration stream comprising water, offer greatly reduced severity of regeneration. The reduced severity of regeneration is expected to result in increased adsorbent life for the molecular sieves. The controlled use of water further reduces coking formation by suppressing the methanol decomposition reactions.

Figure 2:
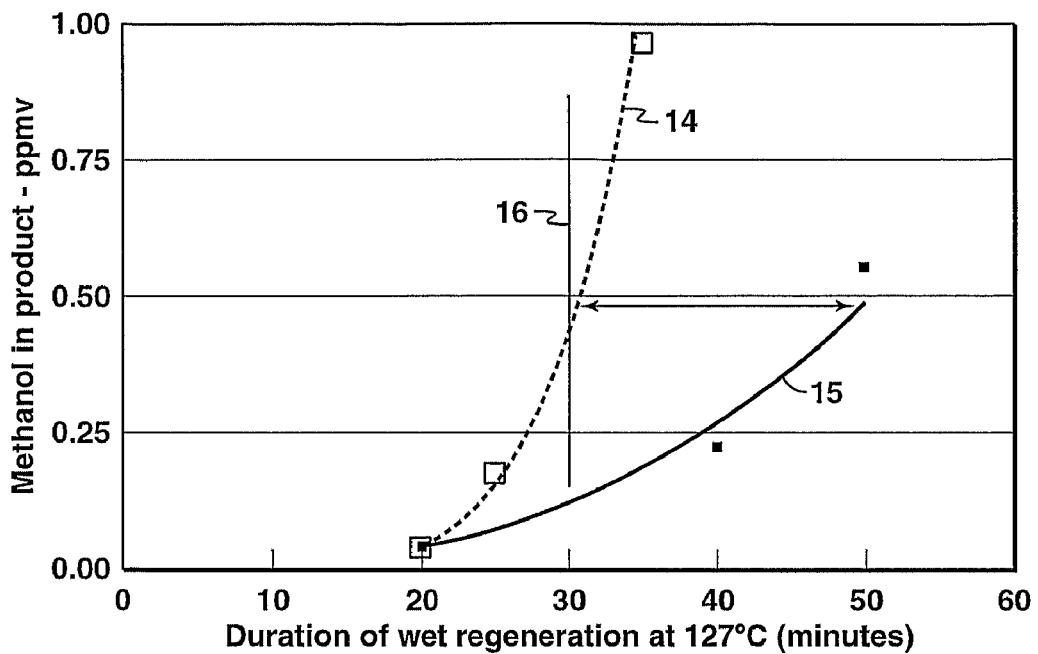
FIG. 2 is a graphical representation of data from Examples 1a-1c and 2a-2c.

FIG. 2 graphically illustrates the results of Example 1 and Example 2 and shows the use of a second bed consisting of a desiccant material, in addition to a bed of molecular sieves (i.e., a mixed bed), offers additional advantages. In FIG. 2, curve 14 corresponds to the estimated trend of product methanol content versus wet regeneration duration for Examples 1a-1c, which utilize a single bed containing molecular sieves. Again, total regeneration time (t1+t2) is fixed at 120 minutes, with the dry regeneration stage having a temperature of 287° C. Curve 15 corresponds to the estimated trend of product methanol content versus wet regeneration duration (t1) for Examples 2a-2c, which utilize a bed containing molecular sieves as well as an alumina bed. As can be seen from FIG. 2, at any given duration of wet regeneration time, for example at a duration of thirty (30) minutes (corresponding to reference line 16 in FIG. 2), the product methanol content achieved by the alumina/molecular sieves system (Example 2) is lower than that of the molecular-sieves-only system (Example 1). It will be observed that a 100% increase is possible (50 minutes vs. 25 minutes) in the duration (t1) of the first stage during the regeneration if an adsorbent bed of molecular sieve is used in combination with an adsorbent bed of alumina, in comparison to a bed consisting of only molecular sieve. FIG. 2 also shows that, under the conditions employed, when the moist regeneration step is conducted for a duration greater than about 30 minutes for the bed configuration containing only molecular sieve, there is breakthrough of methanol into the product. That is, referring to Example 1c and Example 2c, the product methanol content in Example 1c is 0.97 ppmv when the duration of the lower temperature stage is 35 minutes, whereas the product methanol content in Example 2c is only 0.55 ppmv, even when the duration of the lower temperature stage is 50 minutes. With a mixed bed as set forth in Example 2, the curve in FIG. 2 rises more gradually. Example 2 thus illustrates the ability of desiccant materials such as alumina to permit a longer duration of the lower temperature, water-containing stage of the hot purge portion of the regeneration, while at the same time maintaining product quality. As noted above, the use of a lower overall regeneration temperature is helpful in avoiding deactivation of the molecular sieves.

Figure 3:
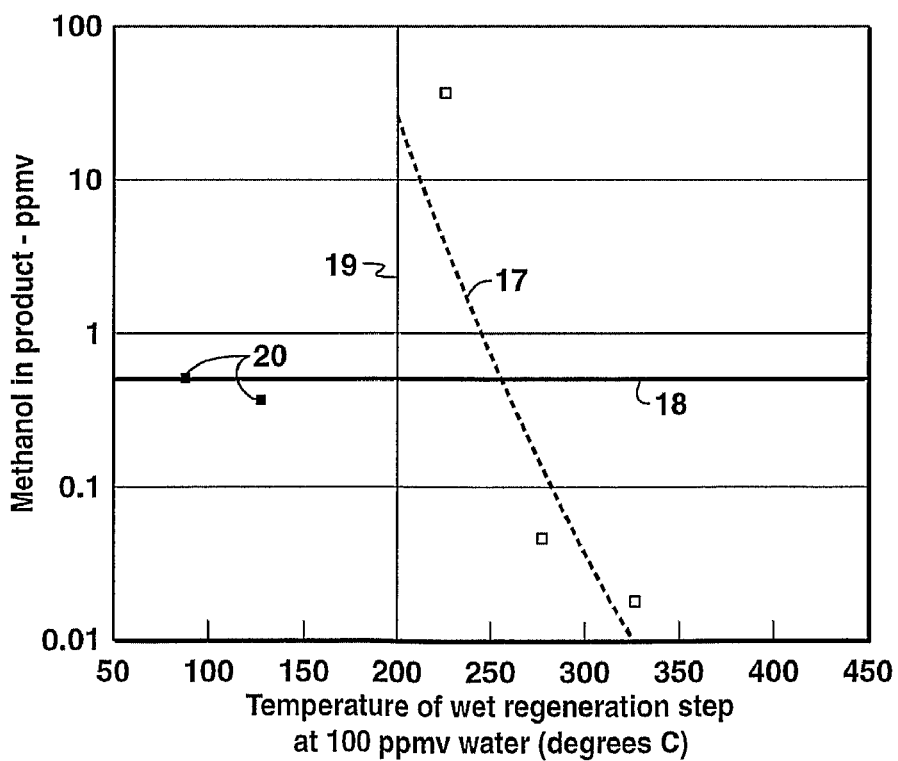
FIG. 3 is a graphical representation of data from Examples 5a-5c and 6a-6b.

FIG. 3, which illustrates the results of Examples 6a-b and Examples 5a-c, further illustrates that advantages that accrue from using a second bed consisting of a desiccant material in addition to a bed of molecular sieves. In FIG. 3, curve 17 corresponds to the estimated trend for product methanol content versus wet regeneration temperature for Examples 5a-5c, which utilize a single bed containing molecular sieves. The data points identified at 20 in FIG. 3 correspond to the results for Examples 6a and 6b, which utilize a bed containing molecular sieves as well as an alumina bed. Reference line 18 has a y-axis intercept of 0.5 ppmv and a slope of zero. Reference line 19 has an x-axis intercept of 200° C. and an infinite slope (i.e., perpendicular to the x-axis). FIG. 3 shows that using the two-bed system allows the incorporation of 100 ppmv water for about half the total regeneration cycle at substantially lower temperature (as low as 50° C.-100° C.), while also maintaining the methanol level at a value less than or very close to 0.5 ppmv. Such an extended infusion of water suppresses greatly the conditions that promote the decomposition reactions. At the low temperatures, alumina can adsorb water in the purge which serves to displace other contaminants. Subsequently, water is desorbed from the bed with less heat required and at moderate conditions since the water-alumina bond is much weaker than that between water and molecular sieve. This allows for improved cleaning of the entire bed, especially the product end where the countercurrent purge first enters the vessel, and this improved cleaning is observed in the lower product contaminant concentrations.

While the foregoing is directed to embodiments of the present invention, other and further embodiments of the invention may be devised without departing from the basic scope thereof, and the scope thereof is determined by the claims that follow.

We claim:

1. A method for removing contaminants from a hydrocarbon stream comprising:
    passing a contaminated hydrocarbon stream through a first adsorbent bed containing molecular sieves to adsorb contaminants on said molecular sieves;
    passing said contaminated hydrocarbon stream through a second adsorbent bed containing a desiccant material;
    contacting said desiccant material with a regeneration fluid stream comprising water to adsorb at least a portion of said water onto said desiccant material to form an at least partially dried regeneration fluid stream in contact with an at least partially hydrated desiccant material;
    heating said at least partially hydrated desiccant material to a temperature above about 100° C. to release water adsorbed thereon into said at least partially dried regeneration fluid stream; and
    passing said at least partially dried regeneration fluid stream through said molecular sieves to desorb and remove at least a portion of said contaminants adsorbed thereon.

2. The method of claim 1 wherein said regeneration fluid stream comprises up to 10,000 ppmv water.

3. The method of claim 1 wherein said regeneration fluid stream comprises from about 10 to about 250 ppmv of water.

4. The method of claim 1 wherein said regeneration fluid stream comprising water is fed counter-currently to the flow direction of said contaminated hydrocarbon stream.

5. The method of claim 1 wherein said second adsorbent bed is positioned relative to said first adsorbent bed such that said second adsorbent bed is downstream of said first adsorbent bed when said contaminated hydrocarbon stream is passed through said first and second adsorbent beds.

6. The method of claim 1 further comprising passing said contaminated hydrocarbon stream through a preliminary adsorbent bed prior to passing said contaminated hydrocarbon stream through said first or second adsorbent beds, said preliminary adsorbent bed comprising a desiccant material.

7. The method of claim 1 wherein the length of said second adsorbent bed (L2) and the length of said first adsorbent bed (L1) are such that the ratio L2/L1 is 1.0 or lower.

8. The method of claim 7 wherein the ratio L2/L1 is about 0.5 or lower.

9. The method of claim 7 wherein the ratio L2/L1 is about 0.3 or lower.

10. The method of claim 6 wherein the combined lengths of said preliminary adsorbent bed and said second adsorbent bed ($L_D$) and the length of said first adsorbent bed (L1) are such that the ratio $L_D$/L1 is 1.0 or lower.

11. The method of claim 10 wherein the ratio $L_D$/L1 is about 0.5 or lower.

12. The method of claim 10 wherein the ratio $L_D$/L1 is about 0.3 or lower.

13. The method of claim 1 wherein said desiccant material is selected from the group consisting of metal oxides, silica gel, and activated carbon.

14. The method of claim 1 wherein said desiccant material is selected from the group consisting of silica and the oxides of the metals in Groups 1, 2, 4, and 13 of the periodic table.

15. The method of claim 1 wherein said desiccant material is selected from the group consisting of alumina, silica, calcium oxide, and titania.

16. The method of claim 1 wherein said desiccant material is selected from the group consisting of alumina and silica.

17. The method of claim 1 wherein said desiccant material is alumina.

18. The method of claim 1 wherein said heating of said at least partially hydrated desiccant material is accomplished by passing a heated regeneration fluid stream comprising water through said desiccant material.

19. The method of claim 1 wherein said regeneration fluid stream comprising water has a temperature between about 50° C. and 400° C.

20. The method of claim 1 wherein said regeneration fluid stream comprising water has an initial temperature below about 100° C.

21. A method for removing contaminants from a hydrocarbon stream comprising:
    passing a hydrocarbon stream comprising contaminants through a first adsorption bed containing a desiccant material;
    passing an effluent from the first adsorption bed into a second adsorption bed containing molecular sieves to adsorb at least a portion of the contaminants onto the molecular sieves;
    passing an effluent from the second adsorption bed into a third adsorption bed containing desiccant material; and
    regenerating the molecular sieves by purging at least said second and third beds, or at least said first and second beds, with a regeneration fluid stream comprising water to desorb and remove at least a portion of the contaminants adsorbed on said molecular sieves, said regeneration fluid stream comprising water contacting either said first adsorption bed containing desiccant material or said third adsorption bed containing desiccant material prior to contacting said second adsorption bed containing molecular sieves.

22. A method for removing contaminants from a hydrocarbon stream comprising:
    passing a hydrocarbon stream comprising contaminants through a first adsorption bed containing molecular sieves to adsorb at least a portion of the contaminants onto the molecular sieves;
    passing an effluent from the first adsorption bed into a second adsorption bed containing a desiccant material; and
    regenerating the molecular sieves by purging said first and second beds with a regeneration fluid stream comprising water to desorb and remove at least a portion of the contaminants adsorbed on said molecular sieves, said regeneration fluid stream comprising water contacting said second adsorption bed containing desiccant material prior to contacting said first adsorption bed containing molecular sieves.

23. The method according to claim 1, 21, or 22 wherein said hydrocarbon stream is a natural gas stream.

24. The method according to claim 1, 21, or 22 wherein said desiccant material is alumina.

25. A method of regenerating molecular sieves, comprising:
- placing said molecular sieves in fluid communication with a bed containing a desiccant material;
- contacting said desiccant material with a regeneration fluid stream comprising water to adsorb at least a portion of said water onto said desiccant material to form an at least partially dried regeneration fluid stream in contact with an at least partially hydrated desiccant material;
- heating said at least partially hydrated desiccant material to a temperature above about 100° C. to release water adsorbed thereon into said at least partially dried regeneration fluid stream; and
- passing said at least partially dried regeneration fluid stream through said molecular sieves to desorb and remove at least a portion of contaminants adsorbed thereon.

26. The method of claim 25 wherein said regeneration fluid stream comprises up to 400 ppmv water.

27. The method of claim 25 wherein said regeneration fluid stream comprises up to 100 ppmv water.

28. The method of claim 25 wherein said desiccant material is alumina.

29. The method of claim 25 wherein said heating of said at least partially dried desiccant material is accomplished by passing a heated regeneration fluid stream comprising water through said desiccant material.

30. The method of claim 25 wherein said regeneration fluid stream comprising water has a temperature between about 50° C. and 400° C.

31. The method of claim 25 wherein said regeneration is conducted using a staged temperature profile by adjusting the temperature of said regeneration fluid stream to an initial temperature between about 50° C. and 100° C. and holding thereat for about 2 to 36 hours; thereafter adjusting the temperature of said regeneration fluid stream to between about 100° C. and 150° C. and holding thereat for about 2 to 12 hours; followed by adjusting the temperature of said regeneration fluid stream to between about 150° C. and 175° C. and holding thereat for about 2 to 12 hours.

32. The method of claim 25 wherein said regeneration fluid stream comprising water has an initial temperature below about 150° C.

33. The method of claim 25 wherein said regeneration fluid stream comprising water has an initial temperature below about 100° C.

34. The method of claim 25 wherein said regeneration is carried out counter-currently.

35. A method for producing a liquefied natural gas, comprising:
- providing a contaminated natural gas stream;
- optionally, passing said contaminated natural gas stream through a first adsorbent bed containing a desiccant material;
- passing said contaminated natural gas stream, or, optionally, passing an effluent from said first adsorbent bed, through a second adsorbent bed containing molecular sieves regenerated according to the method of claim 21 thereby producing a natural gas stream having a reduced contaminant content;
- optionally, passing said natural gas stream having a reduced contaminant content through a third adsorbent bed containing a desiccant material;
- recovering said effluent from said second or, alternatively, from said third adsorbent bed; and
- cooling said effluent to a temperature sufficient to produce a liquefied natural gas at atmospheric pressure.

36. A method for removing methanol from a hydrocarbon stream comprising:
- passing a methanol-contaminated hydrocarbon stream through a first adsorbent bed comprising molecular sieves to adsorb methanol on said molecular sieves; and
- thereafter regenerating said adsorbent bed by passing a regeneration fluid stream comprising water in an amount less than 400 ppmv at a temperature of 75 to 125° C. to desorb and remove methanol adsorbed on said molecular sieves.

37. The method according to claim 35 wherein said contaminated natural gaas stream comprises methanol as a contaminant, said contaminated hydrocarbon stream being passed through said secon adsorbent bed to adsorb methanol on said molecular sieves.

38. A method for removing contaminants from natural gas, comprising:
- providing a natural gas stream comprising contaminants;
- passing said natural gas stream comprising contaminants through a first adsorbent bed containing molecular sieves to adsorb at least a portion of said contaminants onto said molecular sieves;
- passing an effluent from said first adsorbent bed through a second adsorbent bed containing a desiccant material;
- passing a first regeneration fluid stream comprising water counter-currently through said first and second adsorbent beds for a first period of time;
- maintaining the temperature of said first regeneration fluid stream in a range of from about 50° C. to about 200° C. during said first period of time;
- passing a second regeneration fluid stream counter-currently through said first and second adsorbent beds for a second period of time, wherein said second regeneration fluid stream comprises water in an amount less than 20 ppmv;
- maintaining the temperature of said second regeneration fluid stream in a range of from about 250° C. to about 400° C. during said second period of time; and
- cooling said first and second adsorption beds to a temperature below 250° C.

39. The method according to claim 38 wherein said contaminants comprise methanol.

40. The method of claim 38 or 39 wherein said desiccant material is selected from the group consisting of metal oxides and activated carbon.

41. The method of claim 38 or 39 wherein said desiccant material is selected from the group consisting of silica and the oxides of the metals in Groups 1, 2, 4, and 13 of the periodic table.

42. The method of claim 38 or 39 wherein said desiccant material is selected from the group consisting of alumina, silica, calcium oxide, and titania.

43. The method of claim 38 or 39 wherein said desiccant material is selected from the group consisting of alumina and silica.

44. The method of claim 38 or 39 wherein said desiccant material is alumina.

45. A method for producing a liquefied natural gas, comprising:
- providing a first adsorbent bed containing molecular sieves, said molecular sieves having methanol adsorbed thereon;
- providing a second adsorbent bed containing a desiccant material;
- passing a first regeneration fluid stream comprising water counter-currently through said first and second adsorbent beds for a first period of time;

maintaining the temperature of said first regeneration fluid stream in a range of from about 50° C. to about 200° C. during said first period of time;

passing a second regeneration fluid stream counter-currently through said first and second adsorbent beds for a second period of time, wherein said second regeneration fluid stream comprises water in an amount less than about 20 ppmv;

maintaining the temperature of said second regeneration fluid stream in a range of from about 250° C. to about 400° C. during said second period of time;

cooling said first adsorbent bed to a temperature below 250° C. to provide a cooled adsorbent bed containing regenerated molecular sieves;

providing a natural gas stream comprising methanol;

passing said natural gas stream comprising methanol through said cooled adsorbent bed containing regenerated molecular sieves to adsorb at least a portion of said methanol onto said regenerated molecular sieves;

passing an effluent from said cooled adsorbent bed containing regenerated molecular sieves through an adsorbent bed containing a desiccant material;

recovering said effluent from said adsorbent bed containing a desiccant material; and cooling said effluent to a temperature sufficient to produce a liquefied natural gas at atmospheric pressure.

46. A method for regenerating molecular sieves, comprising:

passing a first regeneration fluid stream comprising 10 ppmv or more of water through said molecular sieves adsorbent bed for a first period of time while maintaining the temperature of said first regeneration fluid stream in a range of from about 50° C. to about 200° C.; and passing a second regeneration fluid stream comprising less than 10 ppmv of water through said molecular sieves adsorbent bed for a second period of time while maintaining the temperature of said second regeneration fluid stream in a range of from about 250° C. to about 400° C.

* * * * *